United States Patent [19]

Donley et al.

[11] 4,043,526

[45] Aug. 23, 1977

[54] AUTOPILOT HARDOVER FAILURE PROTECTION SYSTEM

[75] Inventors: Shawn T. Donley, Richlandtown, Pa.; Valentine A. Freitag, Marlton, N.J.

[73] Assignee: The United States of America as represented by the Secretary of the Navy, Washington, D.C.

[21] Appl. No.: 660,308

[22] Filed: Feb. 23, 1976

[51] Int. Cl.² ............................................. G05D 1/00
[52] U.S. Cl. .................................... 244/194; 244/195; 318/563
[58] Field of Search .................... 235/150.2; 244/178, 244/180, 181, 186, 187, 192, 194, 195; 318/563, 565, 584

[56] References Cited

U.S. PATENT DOCUMENTS

| | | | |
|---|---|---|---|
| 2,762,962 | 9/1956 | Meredith et al. | 244/194 X |
| 3,880,385 | 4/1975 | Reynolds et al. | 244/194 |
| Re. 25,491 | 12/1963 | Lee et al. | 244/192 |

Primary Examiner—Stephen G. Kunin
Attorney, Agent, or Firm—R. S. Sciascia; Henry Hansen; Stanton D. Weinstein

[57] ABSTRACT

A system for rapidly disengaging, with minimum nuisance disengagements, a conventional autopilot system upon detecting hardover failure, which is defined as any autopilot failure which results in rapid and sustained displacement of an aircraft aerodynamic control surface. The aircraft pitch rate is measured and compared with established limits. If these limits are exceeded, the system causes automatic disengagement. Disengagement is inhibited for gust disturbances by deriving a nose up or down signal from the pitch rate signal which is then compared with a signal indicating the direction of elevator hinge moment; if the two directions are opposing, disengagement is inhibited. Disengagement is also inhibited in the event of pilot action. Also, the autopilot pitch axis command line is monitored and a disengagement overriding any inhibits is generated when the signal on that line exceeds certain limits for the altitude hold mode and for the attitude hold mode of the autopilot.

48 Claims, 6 Drawing Figures

AUTOPILOT HARDOVER FAILURE PROTECTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to aircraft control devices, and more particularly to autopilot hardover failure control while airborne.

Hardover failure, a serious aircraft flight safety problem, is defined as any failure of the autopilot system which will cause a rapid and sustained displacement of an aircraft aerodynamic control surface to the full extent permitted by physical constraints within the autopilot actuator system. Autopilots are commonly designed so that the maximum aerodynamic control surface deflection that can be attained by the autopilot is a small percentage of the total control surface deflection that can be manually commanded by the pilot. This low autopilot authority serves to limit the effect of a hardover failure on aircraft flight path and enables the pilot to overcome the failure, by use of the control stick or control wheel column. Successful recovery from a hardover failure, however, is dependent in pilot reaction time, which is degraded by pilot fatigue during long flights. Hardover failure along the pitch axis can occur in a nose up as well as in a nose down position. A nose down pitch axis hardover failure will result in rapid loss of altitude by the aircraft. A nose up pitch axis hardover can result in a stall of the aircraft. At low altitudes, crew safety can be jeopardized if hardover failure is not overcome within one second. Often, a delayed pilot reaction to a hardover will result in pilot overcontrol causing the aircraft to undergo violent maneuvers that are worse than the hardover itself.

One general practice has been to employ single-point monitors to disengage the autopilot in the event of failure. A single-point monitor, also known as a single-point failure detector, checks one point in the circuit under study for certain types of failures. Although such devices have served the purpose they have not proved entirely satisfactory under all conditions of service for the reasons that single-point monitors can only protect against failures of particular components within the autopilot. Many failure modes, therefore, are not monitored or controlled. Such piece-wise coverage results in the use of several monitors, each of which can only cover a small percentage of the total system. This, plus the complexity of conventional autopilot systems, results in limited failure detection and coverage unless a very large number of single-point monitors is used, in which case full coverage of all autopilot failure modes still might be obtained. Thus, many failure modes will not be protected against.

Monitors using airframe parameters such as vehicle acceleration or vehicle attitude are capable of detecting a large number of autopilot hardover failure modes, but of necessity must permit some delay, thus allowing some degree of aircraft attitude response to the hardover, before the failure is detected. These monitors typically compare the measured value of an airframe parameter to a reference value. The failure advisory is generated if the value of the measured parameter exceeds the reference value. As the reference value is decreased in order to improve failure detection performance, the number of false or nuisance autopilot disengagements increases rapidly. An example of such a monitor is a g-limiter. A g-limiter disconnects the autopilot when the airframe experiences normal (perpendicular to the floor of the aircraft) accelerations beyond a preset level. However, this device has limitations rendering it unusable for this purpose. A g-limiter will react too slowly to a hardover failure for use with a heavy transport or with an aircraft which is not highly maneuverable. There is as tendency in such aircraft, in the event of hardover failure, to remain in that condition because of inertia or lack of maneuverability. By the time that sufficient g forces have been built up to generate a g-limiter disconnect, the safety of the aircraft could be jeopardized. Furthermore, in the case of an aircraft operating at low altitudes, little time (one second or less) can be allowed for hardover detection, as has been already pointed out. A further problem with regard to the g-limiter is that the level at which the g-limiter would be set to disconnect the autopilot must be low enough to actually detect hardover failure. The g-limiter must not be set so high as to miss a hardover failure. However, if this level is set too low, nuisance disconnects, such as wind gusts or pilot action might cause, will result. The g-limiter cannot be set high enough to avoid a large number of nuisance disconnects without being set too high to rapidly detect some hardover failures. Similarly, a pitch attitude sensor would be too slow because, considering the brief amount of time available for rectifying a hardover failure, by the time that sufficient pitch has been built up by the hardover failure to trigger the pitch sensor, the aircraft could already be in jeopardy. Again, if the triggering level for the pitch attitude sensor is set sufficiently low to avoid this problem, nuisance disconnects can result.

Another means of detecting and correcting hardover failures is a redundant autopilot. Essentially, a redundant autopilot consists of two or more simultaneously operating autopilot channels. Outputs of the multiple channels are compared against one another in such a fashion that a failed channel is voted out. However, this requires extensive cross-channeling and cross-checking between channels, as well as individual channels which have a structure different from that of typical non-redundant autopilots. Accordingly, a non-redundant autopilot could not be incorporated in a redundant autopilot, and so conversion of an existing autopilot from non-redundant to redundant would require replacement of the entire autopilot. Therefore, installation of a redundant autopilot in an existing non-redundant autopilot system would be economically unjustified for the sole purpose of protecting against hardover failures.

SUMMARY OF THE INVENTION

Accordingly, it is the general purpose of the present invention to provide an autopilot failure protection system capable of rapidly disengaging the autopilot in the event of a hardover failure, with a minimum number of nuisance disengagements.

Other objects of the present invention are to provide an autopilot failure protection system capable of autopilot hardover failure protection, detection and control, disengaging the autopilot in the event of autopilot failure, and avoiding nuisance disengagements of the autopilot such as would result from wind gust disturbances or pilot action. Further objects of the present invention are to provide an autopilot failure protection system which is inexpensive, which is capable of detecting a number of autopilot failure modes, and which is capable of detecting all hardover failures. Still further objects of the present invention are to provide an autopilot failure protection system which is capable of rapidly detecting autopilot hardover failure, rapid disengagement of the autopilot in the event of hardover failure, disengaging the autopilot in the event of hardover failure before excessive airframe attitude rates and accelerations develop, without incurring as a result a large increase in the number of nuisance autopilot disengagements, and enabling the pilot to safely assume manual control of the aircraft in the event of autopilot hardover failure without the application of excessive control forces which could result in crew injuries or aircraft damage.

Briefly, these and other objects are accomplished by demodulating aircraft pitch attitude signal from a vertical gyroscope and then differentiating that signal to obtain an earth axis pitch rate signal which is processed by a window comparator to determine if the pitch rate signal is within the established limits. An excessive pitch rate signal will cause disengagement of an autopilot. The disengagement signal is applied directly to the autopilot disconnect system, so disengagement is rapid. Several signals are used to minimize nuisance disconnects when the aircraft maneuvers at rates outside the pitch rate window due to normal autopilot operation or piloted flight through the autopilot. To alleviate nuisance disconnects associated with gust disturbances, the derived earth axis pitch rate is filtered to produce a signal which is a function of pitch attitude. That singal is then applied to a zero-crossing detector to yield a bipolar signal which indicates the direction, nose up or nose down, of any pitch attitude excursion. The elevator hydraulic load signal is processed in a similar fashion to produce a signal whose polarity indicates the direction of the elevator hinge moment. Should the aircraft undergo a pitch attitude perturbation and the elevator hinge moment be in such a direction as to oppose perturbation, an inhibit signal is generated to prevent an autopilot disengagement even if the pitch rate limit is exceeded. This alleviates nuisance disconnects associated with gust disturbances. In addition, the elevator load signal is switched by a relay connected to the autopilot control wheel steering so that the load sensor signal seen by the hardover detector is zero when the pilot is flying the aircraft through control wheel steering. This allows the filtered attitude signal to generage an inhibit when control wheel steering is used. To avoid nuisance disconnects during the operation of the autopilot pitch controller wheel, the signal from that wheel is demodulated, filtered and subtracted from the aircraft attitude signal so that the net change in attitude applied to the pitch rate differentiator is reduced to meet the system pitch rate limit. A single-point monitor and failure detector circuit provides additional protection against hardover failure for attitude hold and altitude hold modes of the autopilot by comparing the signal on the autopilot pitch axis command line with a reference appropriate to whichever of these two modes that autopilot would then be in and forcing autopilot disengagement if the signal is not within the bounds set by that reference. Disengagement commands from this monitor circuit override all of the inhibits mentioned above.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
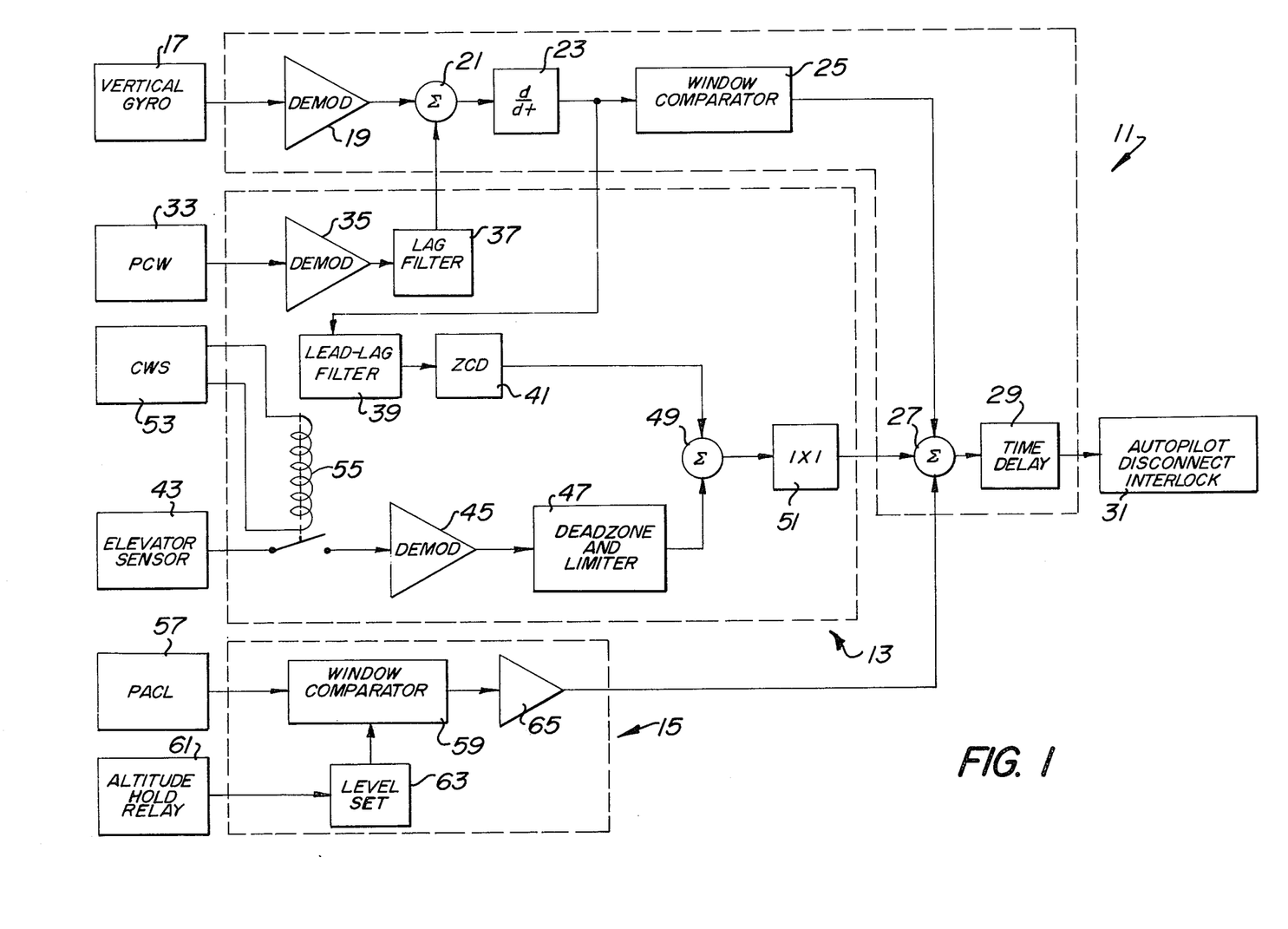
FIG. 1 is a block diagram of an autopilot hardover failure protection system according to the invention.

Referring now to the drawings there is shown in FIG. 1 an autopilot hardover failure protection system, for use with an aircraft whose autopilot is engaged in operation, comprising hardover failure detection system 11, nuisance disconnect inhibit system 13, and monitor circuit 15, with interconnections between these three system components and connections to various standard autopilot components. These standard autopilot components, commonly found in autopilots such as the PB20N Automatic Flight Control System described in Bureau of Naval Weapons publication NAVWEPS 05-45ADA-1 Technical Manual, Intermediate Maintenance, Automatic Flight Control System PB20N, dated 1 Dec. 1965, and used with the subject invention, include autopilot vertical gyroscope (hereinafter referred to as gyro) 17, pitch controller wheel (hereinafter referred to as PCW) 33, control wheel steering (hereinafter referred to as CWS) 53, elevator sensor (which can, for example, be an elevator hydraulic load sensor) 43, autopilot pitch axis command line (hereinafter referred to as PACL) 57, altitude hold relay 61 and autopilot disconnect (or autopilot interlock) 31. PACL 57 is a signal line in the autopilot elevator control channel, carrying the elevator channel feed forward signals. Other standard autopilot components listed above are further described below. Hardover failure detection system 11 upon detecting hardover failure produces a signal which, upon being received by autopilot disconnect 31, would result in disengagement of the autopilot. However, to prevent nuisance disengagements of the autopilot resulting from gust disturbances or from pilot action, nuisance disconnect inhibit system 13 provides inhibit signals to hardover failure detection system 11. Also, monitor circuit 15 provides disengagement signals, which also act as inhibit override signals, to hardover failure detection system 11.

Hardover failure detection system 11 receives aircraft pitch attitude from gyro 17. Gyro 17 is an autopilot gyroscope whose spin axis is periodically aligned with the perpendicular to the earth when the aircraft is not undergoing accelerations. Gyro 17 serves as a reference for the aircraft which is aligned with respect to the earth in order to sense variations in the aircrafts's position with respect to the earth. However, the pitch attitude signal output of gyro 17 is typically a carrier-modulated signal which can, for example, be a suppressed-carrier double-sideband signal, whose amplitude is proportional to pitch attitude of the aircraft. This type of signal is difficult to work with. Accordingly, when aircraft pitch attitude is first received by hardover failure detection system 11, it is first processed by demodulator 19. Demodulator 19, which can, for example, be a synchronous demodulator, demodulates, filters and amplifies the aircraft pitch attitude signal received from gyro 17. For example, demodulator 19 can do so according to the transfer function $$\frac{K_1}{.00056S^2 + .051S + 1}.$$

Figure 2A:
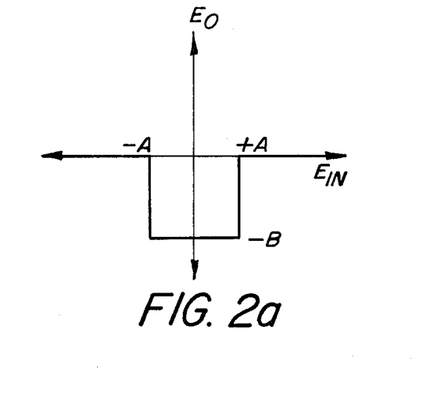
FIGS. 2(a)–2(e) illustrate the nonlinear transfer characteristics for certain components for the system of FIG. 1.

Amplification constant $K_1$ is selected to provide a constant relationship between degrees of pitch attitude and the voltage amplitude of the direct current signal produced by demodulator 19 which will not be so large as to result in saturation of the demodulator, which would render that circuit unable to produce signals representative of larger values of pitch attitude. The value of $K_1$ is selected based on the anticipated range of the input signals and of the various output signals. The value of $K_1$ can be, for example, 0.4 volts dc per degree. The demodulated aircraft pitch attitude signal produced by demodulator 19 then passes through summer 21 which also receives a signal from filter 37 as discussed below. The output of summer 21 is then differentiated by differentiator 23 to obtain earth axis pitch rate. Differentiator 23 can, for example, be a lead filter which over the range used performs differentiation. The transfer function of differentiator 23 can, for example, be $$\frac{-2.4s}{(1 + .024s)^2}$$

in which case the amplitude of the signal produced by the differentiator is one volt per degree per second of pitch rate. Earth axis pitch rate from differentiator 23 is then processed by comparator 25, which can, for example be a window comparator, to determine if the pitch rate window is within established limits. The nonlinear transfer characteristics for comparator 25 as a window comparator for this embodiment is shown in FIG. 2(a). As illustrated in FIG. 2(a), if the pitch rate is excessive, then a zero-level signal will be produced by comparator 25. Otherwise, if the pitch rate is within limits $-A$ and $+A$, then a constant signal of amplitude $-B$ will be produced. A pitch rate window defined by $A = 1.5°$ per second (which, for the differentiator 23 transfer function given above, would be $A = 1.5$ volts) was found to be adequate for this embodiment during flight tests. The signal produced by comparator 25 then is inverted by summer 27 which receives inhibit signals from nuisance disconnect inhibit system 13 and disengagement signals from monitor circuit 15, as has been discussed above and is further discussed below. The output of summer 27 is received by time delay circuit 29. Time delay circuit 29 applies a time delay of predetermined duration, which can, for example, be 0.1 seconds, in order to mask switching transients in the circuitry of the subject invention. The signal produced by time delay circuit 29 is then provided to the autopilot disconnect 31. Autopilot disconnect 31 for the PB20N autopilot, upon receiving an appropriate signal, causes quick disengagement of the autopilot. The state of the signal received by autopilot disconnect 31 determines whether the autopilot is to be disconnected. For example, where comparator 25 produces a zero-voltage signal when the pitch rate exceeds the set limits, then a signal of zero volts or less applied to autopilot disconnect 31 would result in disengagement of the autopilot, while a signal of greater than zero volts applied to the autopilot disconnect 31 would result in an autopilot disengagement. Necessarily, some safety gap should be allowed between the disconnect and no disconnect states of the signal. Accordingly, a signal amplitude of zero volts is to be considered the disconnect state while a signal of $+B$ volts will be considered the no disconnect state. As one example, B can be $+6$ volts. Should the autopilot be disengaged, autopilot disconnect 31 would typically illuminate a flashing warning light and provide other alarms to the pilot which are common components of existing autopilot systems.

Since pitch rate, instead of pitch attitude or airframe acceleration, is used to detect hardover failure, hardover failure detection is made more rapid. Also, the use of nuisance disconnect inhibit system 13 permits use of a lower hardover detection level without such an amount of nuisance disconnects as would make use of such a lower level unfeasible. This lower level further increases the rapidity of hardover detection. Since the signal which causes disengagement is applied directly to autopilot disconnect 31, disengagement of the autopilot once a hardover failure has been detected is made more rapid. Thus, the subject invention can rapidly disengage the autopilot in the event of hardover failure.

Wind gust disturbances can cause rapid, if brief, changes in aircraft pitch attitude which could be sensed as hardover failures by hardover failure detection system 11 unless such failure detection is inhibited. Such gust disturbances will quickly result in the autopilot causing an elevator deflection to oppose and correct such a change in aircraft pitch attitude. Accordingly, nuisance disconnect inhibit system 13 inhibits nuisance disengagements of the autopilot resulting from gust disturbances by comparing the direction of aircraft pitch attitude deflection with the direction of elevator hinge moment. If the two directions oppose each other, indicating that the pitch attitude deflection is being caused by gust disturbance and not by the autopilot, then an inhibit signal is generated to prevent any autopilot disengagement for as long as the opposing deflections last, even if the pitch rate limit is exceeded during this period.

The elevator signal from which the elevator direction signal is detected is provided by elevator sensor 43. Elevator sensor 43 can, for example, be the elevator hydraulic load sensor. That sensor measures the differential pressure across the hydraulic ram in the boost actuator which turns the elevator. An elevator position sensor could be used instead, if the trim is known or can be compensated for. Any means of directly measuring the moment about the hinge elevator would also be appropriate. The signal from elevator sensor 43 is demodulated, filtered and amplified by demodulator 45. If the elevator hydraulic load sensor is used as elevator sensor 43, then the transfer function of demodulator 45 can, for example, be $$\frac{K_2}{.0018s^2 + .128s + 1}.$$

Amplification constant $K_2$ is selected to suitably scale the output of elevator sensor 43. Amplification constant $K_2$ should be sufficiently high so that an autopilot-induced elevator deflection opposing a gust disturbance can be detected, but sufficiently low so that trivial elevator deflections would be ignored, and can, for example, be 0.02 volts dc per pound-per-square-inch change sensed by the elevator hydraulic load sensor. The demodulated elevator sensor signal produced by demodulator 45 is then processed by deadzone and limiter 47 to produce a polarity coded elevator hinge moment voltage which is used as the elevator direction signal, as is further discussed below.

The pitch attitude direction signal is derived from the pitch rate signal produced by differentiator 23. In order to do so, the pitch rate signal is first filtered by filter 39. Filter 39 is a compensating filter, which can, for example, be a lead-lag filter, which compensates for all dynamics of demodulator 19, differentiator 23, and demodulator 45, so that there is no phase difference between the pitch direction and elevator direction signals which are to be compared. The transfer function of filter 39 is selected so that the transfer function of differentiator 23 and filter 39 together models the autopilot used, based on the transfer function of that autopilot. As a result, the signal produced by filter 39 approximates the elevator position command signal produced by that autopilot, and always indicates the same direction of pitch attitude change as that autopilot elevator position command signal. Where filter 39 is a lead-lag filter, and the transfer functions given above for demodulator 19, differentiator 23, and demodulator 45 apply, then the transfer function for filter 39 can for example be $$-27.3 \frac{.11s + 1}{3s + 1}.$$

Figure 2B:
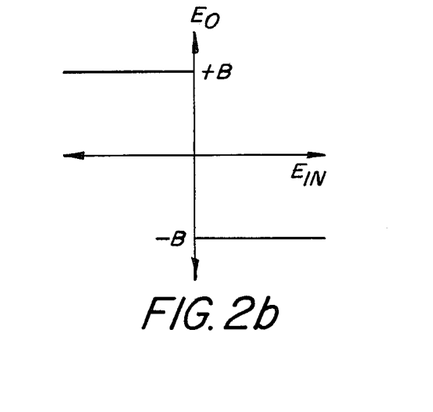
Figure 2C:
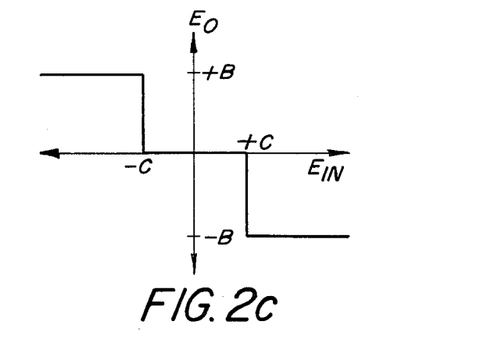

Filter 39 thus produces a signal which is a function of pitch attitude change. That signal is then processed by zero-crossing detector (hereinafter referred to as ZCD) 41 to produce a bipolar signal which indicates the direction, nose up or nose down, of any pitch attitude excursion. Where nose up pitch attitude is considered positive for the signal received by ZCD 41, and nose down elevator deflection is considered positive for the signal received by deadzone and limiter 47, the nonlinear transfer characteristics for this embodiment for ZCD 41 is as shown in FIG. 2(b), and the nonlinear transfer characteristics for this embodiment for deadzone and limiter 47 is as shown in FIG. 2(c). These two direction signals are then compared by being added at summer 49. If the two directions are the same, and are not opposing, then the two direction signals will cancel each other out when added. Summer 49 would then produce a zero-voltage signal. Otherwise, if the two directions are opposing, then summer 49 would produce a signal of amplitude +2B or −2B, unless summer 49 is limited to a smaller maximum output amplitude. The signal produced by summer 49 is then processed by absolute value generator 51, which produces a signal which is the absolute value of the signal from summer 49. Thus, if the two directions are the same, absolute value generator 51 will produce a zero-voltage signal. If the two directions are opposing, indicating a gust disturbance, a positive-voltage signal will be generated. The output of comparator 25 is subtracted from the output of absolute value generator 51 by summer 27. If the elevator and pitch attitude directions were not opposing, then there would be no inhibit, and summer 27 would produce the inverse of the signal produced by comparator 25. If the elevator and pitch attitude directions were opposing, then absolute value generator 51 would produce a positive-voltage signal from which the signal produced by comparator 25 is subtracted, so that the signal produced by summer 27 is at least of the value of the signal produced by absolute value generator 51. Disengagement of the autopilot is thus inhibited for this latter situation of opposing directions, which indicates a gust distrubance, since summer 27 is thus prevented from producing a zero-volate signal regardless of the signal produced by comparator 25. Of course, the maximum signal amplitude, if any, which can be produced by summer 49 should be set to allow an inhibit signal of the desired "no disconnect" level.

If a signal direction polarity for the signal produced by either filter 39 or demodulator 45, but not both, is desired, then reversing the polarity of the transfer characteristics for either ZCD 41 or deadzone and limiter 47, but not both, would be necessary. This is so that opposing directions would still result in a positive-voltage signal from absolute value generator 51. Obviously, changing the direction polarities for both signals, or for both ZCD 41 and deadzone and limiter 47 would have no effect on the signal produced by absolute value generator 51.

The deadzone in deadzone and limiter 47 is used for a number of reasons. Elevator transients are eliminated. Since a substantial elevator deflection would be necessary to cause a hardover failure or to correct a gust distrubance which the subject invention would detect as a hardover failure but for nuisance disconnect inhibit system 13, there is no need to consider small or insubstantial elevator deflections, which fall within the deadzone. For this reason, although demodulated elevator signal values which fall within the deadzone will, when added to the signal from ZCD 41, cause a positive-voltage inhibit signal to be produced by absolute value generator 51, no hardover failure could occur in the deadzone range, since elevator deflection is the pitch attitude control for the aircraft. Use of the deadzone also avoids simultaneous electrical switching transients of ZCD 41 and deadzone and limiter 47. If both ZCD 41 and deadzone and limiter 47 had switching transients at $E_{in} = 0$, for example, then for operation in the vicinity of $E_{in} = 0$, timing problems with the appearance of corresponding signals at summer 49 could result, causing unwanted inhibits or lack of inhibits. The size of the deadzone can, for example be $\pm C = \pm 1.2$ volts.

Another cause of substantial false or nuisance disconnects which are inhibited by nuisance disconnect inhibit system 13 is the operation by the pilot of controls on the autopilot enabling the pilot to manually adjust the aircraft position or to steer the aircraft while the autopilot is in operation. Operation of such controls allows the pilot to adjust external control surfaces, which could result in deflections or pitch rates which exceed the limits set in comparator 25. Not all autopilots have such controls available. However, presence or absence of these controls in the autopilot being used is not critical to the subject invention; absence of any of these controls only eliminates the need for the corresponding circuit(s) used to protect against nuisance disconnects resulting from alterations in aircraft attitude caused by operation of such control(s), and such circuits can then be inactivated or eliminated during use of the subject invention with that particular autopilot.

One such pilot-operated control is CWS (Control Wheel Steering) 53, which allows the pilot to steer the aircraft while the autopilot is in operation. When the pilot is flying through CWS 53, a signal is provided by CWS to shut off the autopilot until CWS operation ends, at which time the autopilot resumes control of the aircraft. In the subject invention, this signal from CWS 53 is used to switch relay 55. Relay 55 is normally open without power, but is closed during normal operation, while CWS 53 is not being used by the pilot. When CWS 53 is being used, relay 55 is switched so that it can, for example, apply a zero-voltage signal to demodulator 45 by creating an open circuit on the input line to that demodulator. As discussed above, when a zero-voltage signal is applied to demodulator 45, an inhibit signal results, since demodulator 45 would then produce a zero-voltage output, which would be within the deadzone of deadzone and limiter 47. Since ZCD 41 will always have a nonzero output, the sum, produced by summer 49, of the ZCD output and the zero-voltage output of deadzone and limiter 47, while operating within the deadzone range, will be nonzero. As a result, absolute value generator 51 will produce a positive-voltage signal which will inhibit any disengagement of the autopilot by the subject invention. This inhibit continues while CWS 53 is being used, after which the CWS returns relay 55 to its position of normal operation.

Another such pilot-operated control on the autopilot is PCW (Pitch Controller Wheel) 33, which allows the pilot to manually adjust aircraft pitch attitude, while the autopilot is in operation, by turning a thumbwheel. Where the autopilot has such a control, the signal from PCW 33 is demodulated and amplified by demodulator 35. The demodulated pitch wheel signal then is processed by filter 37. Filter 37 is a compensating filter which models the autopilot in order to compare the output of PCW 33 with the response of the autopilot to the commands of the PCW, in order to adjust the phase of the demodulated pitch wheel signal so that it matches the phase of the demodulated aircraft pitch attitude signal as produced by demodulator 19. Filter 37 can, for example, be a lag filter. Demodulator 35 and filter 37 considered together as a unit can, for example, have a transfer function of $$\frac{K_3}{.0078s^3 + .258s^2 + .98s + 1}.$$

The valve of amplification constant $K_3$ is selected so that a change in the position of PCW 33 will cancel the resulting output of gyro 17 which is due to the PCW command. In other words, the output due to the PCW 33 command should equal the resulting attitude change of the aircraft as sensed at summer 21. The value of $K_3$ can be, for example, 0.27 volts d.c., per degree commanded at PCW 33. The filtered pitch wheel signal produced by filter 37 is then, at summer 21, subtracted from the demodulated aircraft pitch attitude signal produced by demodulator 19, so that the net change in attitude which is applied to differentiator 23 is reduced to meet the system pitch rate limit. In this way any change in aircraft pitch attitude resulting from operation of PCW 33 is compensated for and will not cause an unwanted or nuisance disengagement of the autopilot.

Figure 2D:
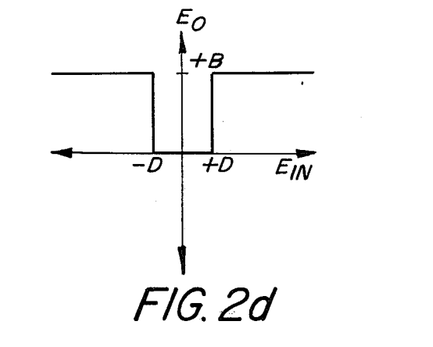
Figure 2E:
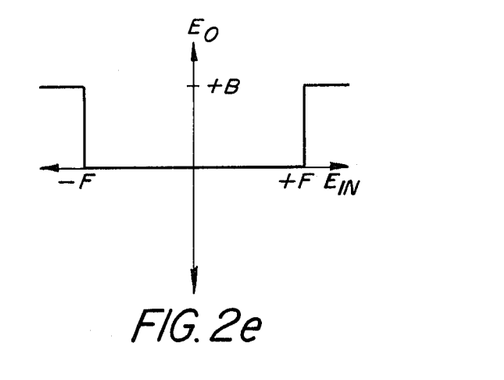

Monitor circuit 15 has been included in the subject invention to protect against several specific failure modes for the autopilot. Although these failures are protected against by hardover failure detection system 11, monitor circuit 15 affords additional protection by monitoring PACL 57 for the altitude hold and attitude hold modes of the autopilot. The level of the signal on PACL 57 is compared against a reference by comparator 59 wich can, for example, be a window comparator. Should this level be within the limits defined by the positive and negative values of this reference, comparator 59 would produce a zero-voltage signal; otherwise, comparator 59 would produce a signal of +B volts d.c., indicating that a failure has been detected. Two references are used for this purpose, one for autopilot altitude hold mode and one for autopilot attitude hold mode. Level set 63 determines which reference is to be used at any particular time while monitor circuit 15 is in operation. Level set 63 is a two-position switch which can, for example, be a switching transistor with a voltage divider. Altitude hold relay 61 indicates whether the autopilot is in altitude hold mode or in attitude hold mode. When the autopilot altitude hold system is operating, autopilot altitude hold relay 61 will switch level set 63, for example by providing a positive-voltage signal to the level set, so that the level set produces the reference for the altitude hold mode. Otherwise, level set 63 would produce the reference for the attitude hold mode. The reference for the altitude hold mode can, for example, be ± 1.2 volts rms, and the reference for the attitude hold mode can, for example, be ±6 volts rms. Those values were found to be reasonable based on flight tests. For those reference values, FIG. 2(d) illustrates the transfer characteristics for this embodiment of comparator 59 as a window comparator for the altitude hold mode, where $D = 1.2$ volts rms, and FIG. 2(e) illustrates the transfer characteristics for this embodiment of comparator 59 as a window comparator for the attitude hold mode, where $F = 6$ volts rms. The signal produced by comparator 59 is used to override any inhibit signals and to disengage the autopilot when a failure is detected. This override signal is passed through high-gain amplifier 65, whose output is subtracted at summer 27, from the signals produced by comparator 25 and absolute values generator 51. If monitor circuit 15 does not detect a failure, its resulting zero-voltage output would not alter the disengagement signal produced by hardover failure detection system 11 and applied to autopilot disconnect 31. However, if monitor circuit 15 does detect a failure, then the high gain provided by amplifier 65 to the resulting positive-voltage signal produced by comparator 59 enables that signal, when subtracted at summer 27, to reduce the output of summer 27 to a negative value even if both a no-disconnect signal from comparator 25, and an inhibit signal from absolute value generator 51, are present. A negative output from summer 27, as discussed above, would result in disengagement of the autopilot via autopilot disconnect 31. Thus, a failure signal from monitor circuit 15 would otherwise both the no-disconnect signal and any inhibit signal present. Without amplifier 65, monitor circuit 15 could still cause disengagement of the autopilot, even if a no-disconnect signal or an inhibit signal were present at summer 27, but not if both of those signals were present. Because of the narrow limits for the altitude hold mode, monitor circuit 15 also provides additional savings in time by being able to detect a hardover failure faster than can hardover failure detection system 11, but only while the autopilot is in altitude hold mode.

The signal produced by summer 27 passes through the time delay 29, which applies a time delay of predetermined duration to that signal to mask switching transients in the circuitry of the subject invention, before that signal is received by autopilot disconnect 31. The duration of the time delay can, for example, be 0.1 seconds.

Although hardover failure detection system 11 was discussed above as a pitch rate sensor, that system could also receive and operate with roll or yaw signals in the same manner as its operation with the aircraft pitch attitude signal. Gyro 17 could provide such signals. If a roll signal is used, then demodulator 35 and filter 37 could operate using the signal produced by the autopilot turn controller wheel, if the autopilot has one, instead of PCW 33. The autopilot turn controller wheel is a standard autopilot component, commonly found in autopilots such as the PB20N automatic flight control system, which enables the pilot to adjust aircraft roll axis position. Also, the polarity of each of the component transfer characteristics illustrated in FIG. 2, and of each of the component transfer functions described above, can vary according to the polarity of each of the various input signals, and according to any desired change in polarity of any of the component transfer characteristics or transfer functions described above.

In summary, the subject invention derives earth axis pitch rate by demodulating and differentiating a pitch attitude signal provided by the autopilot vertical gyroscope 17. This pitch rate signal is then processed by a window comparator 25 to determine if the pitch rate is within the established limits. If the pitch rate is excessive, then the signal produced by the window comparator 25, applied to the autopilot disconnect 31, causes disengagement of the autopilot. The pitch attitude signal, before being differentiated, is reduced by the amount of pitch axis change commanded at the autopilot pitch controller wheel 33, to prevent nuisance autopilot disengagements resulting from operation of that wheel. The window comparator 25 output signal is combined, at a summer 27, with two other signals, which also affect disengagement of the autopilot, before arriving at the autopilot disconnect 31. To derive one of these signals, a bipolar signal indicating the direction of pitch attitude excursion, derived by a filter 39 and a zero-crossing detector 41 from the pitch rate signal, is compared at another summer 49 with a signal indicating the direction of elevator hinge moment, which is derived by a demodulator 45 and a deadzone and limiter 47 from the signal produced by an elevator sensor 43. Should the aircraft undergo a pitch attitude perturbation, and the elevator hinge moment be in such a direction as to oppose the perturbation, indicating a gust disturbance, an inhibit signal is generated to prevent an autopilot disengagement even if the pitch rate limit is exceeded. This inhibit signal is combined with an override signal and the window comparator 25 output signal at summer 27. A time delay is applied to the signal produced by that summer 27, to mask transients in the subject invention, before that signal is received by the autopilot disconnect 31. The override signal is the output signal, amplified with a high gain, of another window comparator 59 which similarly processes the pitch axis command signal on the autopilot pitch axis command line. One of two sets of limits are used with this second window comparator 59, depending on the state of the autopilot altitude hold relay 61 which indicates whether the autopilot is in altitude hold mode or in attitude hold mode. The override signal forces disengagement of the autopilot, whether or not the inhibit signal would inhibit such disengagement, if the path axis command signal is not within appropriate set limits. Finally, the elevator sensor 43 signal is switched by a relay 55 controlled by the autopilot control wheel steering 53, so that disengagement of the autopilot is inhibited while the autopilot control wheel steering 53 is in use, unless the override signal forces disengagement of the autopilot.

Thus there has been provided a novel autopilot failure protection system which is capable of rapidly disengaging the autopilot in the event of a hardware failure, with a minimum number of nuisance disengagements. This autopilot failure protection system uses pitch rate as an information source for hardover detection, and limits nuisance disconnects by means of feedback signals. This system is capable of autopilot hardover failure protection, detection and control, disengaging the autopilot in the event of autopilot failure, and avoiding nuisance disengagements of the autopilot such as would result from wind gust disturbances or pilot action. Unlike single-point monitors, the subject invention can detect a number of autopilot failure modes. At the same time, the monitor limits for the primary signal used, attitude rate, can be made much tighter without incurring a large increase in the number of nuisance disengagements of the autopilot, and so the subject invention will disengage the autopilot in the event of hardover failure before excessive airframe attitude rates and accelerations develop. Also, this system is inexpensive and is capable of detecting all hardover failures. Furthermore, this system is capable of rapidly detecting autopilot hardover failure and rapid disengagement of the autopilot in the event of hardover failure, thus enabling the pilot to safely assume manual control of the aircraft in the event of autopilot hardover failure without the application of excessive control forces which could result in crew injuries or aircraft damage.

Obviously many modifications and variations of the present invention are possible in light of the above teachings. It is therefore to be understood that within the scope of the appended claims the invention may be practiced otherwise than as specifically described.

What is claimed is:

1. An autopilot failure protection system for an aircraft, comprising:

first signal processing means responsive to a signal indicative of the actual pitch attitude of the aircraft and for producing thereform a pitch rate signal and a warning signal;

nuisance disconnect inhibiting means for receiving the pitch rate signal and an aircraft elevator signal and for producing an inhibit signal; and first summing means for receiving the warning signal and the inhibit signal, for producing a disengagement signal which represents the combination of the warning signal and of the inhibit signal, and for providing the disengagement signal to an aircraft autopilot.

2. An autopilot failure protection system as defined in claim 1 wherein said first signal processing means comprises:

a differentiator receiving the aircraft pitch attitude signal and producing a pitch rate signal; and first comparing means for receiving the pitch rate signal, for comparing the pitch rate signal with a predetermined reference value, and for producing the warning signal whose value indicates whether the pitch rate signal exceeds the predetermined reference value.

3. An autopilot failure protection system as defined in claim 2 wherein said differentiator comprises a lead filter.

4. An autopilot failure protection system as defined in claim 2 wherein said first comparing means comprises a first window comparator.

5. An autopilot failure protection system as defined in claim 2, further comprising:
time delay means receiving the disengagement signal for applying a predetermined time delay thereto.

6. An autopilot failure protection system as defined in claim 2 wherein said first signal processing means comprises:
first demodulating means for receiving the aircraft pitch attitude signal and for providing a demodulated pitch attitude signal to said differentiator.

7. An autopilot failure protection system as defined in claim 6, further comprising:
second demodulating means for receiving and demodulating an aircraft pitch wheel signal and producing a demodulated pitch wheel signal;
first compensating filter means for receiving the demodulated pitch wheel signal and producing a filtered demodulated pitch wheel signal whose phase to the phase of the pitch attitude signal; and
third summing means operatively interposed between said first demodulating means and said first signal processing means, for receiving the demodulated pitch attitude signal and the filtered demodulated pitch wheel signal, for producing a corrected pitch attitude signal which represents the difference between the demodulated pitch attitude signal and the filtered demodulated pitch wheel signal, and for providing the corrected pitch attitude signal to said differentiator.

8. An autopilot failure protection system as defined in claim 7 wherein said first compensating filter means comprises filter means comprises a lag filter.

9. An autopilot failure protection system as defined in claim 1, further comprising:
first compensating filter means for receiving an aircraft pitch wheel signal and producing a filtered pitch wheel signal whose phase corresponds to the phase of the pitch attitude signal; and
third summing means receiving the pitch attitude signal and the filtered pitch wheel signal, for producing a corrected pitch attitude signal which represents the difference between the pitch attitude signal and the filtered pitch wheel signal, and for providing the corrected pitch attitude signal to said first signal processing means.

10. An autopilot protection system as defined in claim 9 wherein said first compensating filter means comprises a lag filter.

11. An autopilot failure protection system as defined in claim 1 wherein said nuisance disconnect inhibiting means comprises:
second signal processing means for receiving the pitch rate signal and for producing a bipolar signal indicating the direction of any aircraft pitch attitude excursion;
third signal processing means for receiving on aircraft elevator signal for producing a direction signal whose polarity indicates the direction of elevator loading;
second summing means for receiving the bipolar signal and the direction signal and for producing a combination signal which represents the combination of the bipolar signal and of the direction signal; and absolute value generating means for receiving the combination signal and for producing the inhibit signal which is the absolute value of the combination signal.

12. An autopilot failure protection system as defined in claim 11 wherein said second signal processing means comprises a zero-crossing detector.

13. An autopilot failure protection system as defined in claim 12 wherein said second signal processing means further comprises second compensating filter means for receiving the pitch rate signal and providing a filtered pitch attitude change signal, indicating the direction of any pitch attitude change, and whose phase has been adjusted so that the phase of the bipolar signal corresponds to the phase of the direction signal, to said zero-crossing detector.

14. An autopilot failure protection system as defined in claim 13 wherein said second compensating filter means comprises a lead-lag filter.

15. An autopilot failure protection system as defined in claim 11 wherein said third signal processing means comprises a deadzone and limiter.

16. An autopilot failure protection system as defined in claim 15 wherein said third signal processing means further comprises:
third demodulating means for receiving and demodulating said elevator signal and providing said elevator signal as demodulated to said deadzone and limiter.

17. An autopilot failure protection system as defined in claim 11, further comprising:
first switching means for receiving an autopilot control wheel steering signal, for removing the aircraft elevator from said third signal processing means and for providing a predetermined signal to said third signal processing means, when the steering signal is in use.

18. An autopilot failure protection system as defined in claim 17 wherein said first switching means comprises a relay.

19. An autopilot failure protection system as defined in claim 1 further comprising:
second comparing means for receiving an aircraft pitch axis command signal, for comparing the command signal with an externally determined reference value, for producing an override signal whose value indicates whether the command signal exceeds the externally determined reference value and for producing the override signal to said first summing means; and
second pitching means for receiving an autopilot altitude hold signal, for providing one of two predetermined reference signals, selected according to the state of the hold signal, as the externally determined reference value to said second comprising means.

20. An autopilot failure protection system as defined in claim 19 wherein said second comparing means comprises a second window comparator.

21. An autopilot failure protection system as defined in claim 19, further comprising:
amplifier means, operatively interposed between said comprising means and said first summing means, for amplifying the override signal.

22. An autopilot failure protection system for an aircraft, comprising:
signal processing means for receiving an aircraft pitch attitude signal and for producing a pitch rate signal; and a first window compartor for receiving the pitch rate signal, for comparing the pitch rate signal with a predetermined reference value, for producing a disengagement signal whose value indicates whether the pitch rate signal exceeds the predetermined reference value, and for providing the disengagement signal to an aircraft autopilot.

23. An autopilot failure protection system for an aircraft, comprising:
signal processing means for receiving an aircraft pitch attitude signal and for producing a pitch rate signal;
first comparing means for receiving the pitch rate signal, for comparing the pitch rate signal with a predetermined reference value, for producing a disengagement signal whose value indicates whether the pitch rate signal exceeds the predetermined reference value, and for providing the disengagement signal to an aircraft autopilot; and
time delay means receiving the disengagement signal for applying a predetermined time delay thereto.

24. An autopilot failure protection system for an aircraft, comprising:
first demodulating means for receiving an aircraft pitch attitude signal and for producing a demodulated pitch attitude signal;
second demodulating means for receiving and demodulating an aircraft pitch wheel signal and for producing a demodulated pitch wheel signal;
compensating filter means for receiving the demodulated pitch wheel signal and producing a filtered demodulated pitch wheel signal whose phase corresponds to the phase of the pitch attitude signal;
first summing means operatively interposed between said first demodulating means and said signal processing means for receiving the demodulated pitch attitude signal and the filtered demodulated pitch wheel signal, and for producing a corrected pitch attitude signal which represents the difference between demodulated pitch attitude signal and the filtered demodulated pitch wheel signal;
signal processing means for receiving said corrected pitch attitude signal and for producing a pitch rate signal; and
first comparing means for receiving the pitch rate signal, for comparing the pitch rate signal with a predetermined reference value, for producing a disengagement signal whose value indicates whether the pitch rate signal exceeds the predetermined reference value, and for providing the disengagement signal to an aircraft autopilot.

25. An autopilot failure protection system as defined in claim 24 wherein said compensating filter means comprises a lag filter.

26. An autopilot failure protection system for an aircraft, comprising:
compensating filter means for receiving an aircraft pitch wheel signal and producing a filtered pitch wheel signal whose phase corresponds to the phase of an aircraft pitch attitude signal;
first summing means receiving the pitch attitude signal and the filtered pitch wheel signal, for producing a corrected pitch attitude signal which represents the difference between the pitch attitude signal and the filtered pitch wheel signal;
signal processing means for receivng the corrected pitch attitude signal and for producing a pitch rate signal; and
first comparing means for receivng the pitch rate signal, for comparing the pitch rate signal with a predetermined reference value, for producing a disengagement signal whose value indicates whether the pitch rate signal exceeds the predetermined reference value, and for providing the disengagement signal to an aircraft autopilot.

27. An autopilot failure protection system as defined in claim 26 wherein said compensating filter means comprises a lag filter.

28. An autopilot failure protection system for an aircraft comprising:
signal processing means for receiving an aircraft pitch attitude signal and for producing a pitch rate signal;
first comparing means for receiving the pitch rate signal, for comparing the pitch rate signal with a predetermined reference value, and for producing a disengagement signal whose value indicates whether the pitch rate signal exceeds the predetermined reference value;
second comprising means for receiving an aircraft pitch axis command signal, for comparing the command signal with an externally determined referenced value, and for producing an override signal whose value indicates whether the command signal exceeds the externally determined reference value;
switching means for receiving an autopilot altitude hold signal for providing one of two predetermined reference signals selected according to the state of the hold signal, as the externally determined reference value, to said second comprising means; and
second summing means for receiving the disengagement signal and the override signal, for producing a disconnect signal representing the combination of the disengagement signal and the override signal, and for providing the disconnect signal to the autopilot.

29. An autopilot failure protection system as defined in claim 28 wherein said second comparing means comprises a second window comparator.

30. An autopilot failure protection system as defined in claim 28 comprising:
amplifier means operatively interposed between said second comprising means and said second summing means for amplifying the override signal.

31. An autopilot failure protection system as defined in claim 28 comprising:
time delay means receiving the disconnect signal for applying a predetermined time delay thereto.

32. An autopilot nuisance disconnect inhibit system comprising:
first signal processing means for receiving an aircraft pitch rate signal and for producing a bipoloar signal indicating the direction of any aircraft pitch attitude excursion;
second signal processing means for receiving an aircraft elevator signal for producing a direction signal whose polarity indicates the direction of elevator loading;
first summing means for receiving the bipolar signal and the direction signal and for producing a combination signal which represents the combination of the bipolar signal and of the direction signal; and
absolute value generating means for receiving the combination signal, for producing an inhibit signal which is the absolute value of the combination signal and for providing the inhibit signal to the autopilot.

33. An autopilot nuisance disconnect inhibit system as defined in claim 32 wherein said first signal processing means comprises a zero-crossing detector.

34. An autopilot nuisance disconnect inhibit system as defined in claim 33 wherein said first signal processing means further comprises compensating filter means for receiving the pitch rate signal and providing a filtered pitch attitude change signal, indicating the direction of any pitch attitude change signal, indicating the direction of any pitch attitude change, and whose phase has been adjusted so that the phase of the bipolar signal corresponds to the phase of the direction signal, to said zero-crossing detector.

35. An autopilot nuisance disconnect inhibit system as defined in claim 34 wherein said compensating filter means comprises a lead-leg filter.

36. An autopilot nuisance disconnect inhibit system as defined in claim 32 wherein said second signal processing means comprises a deadzone and limiter.

37. An autopilot nuisance disconnect inhibit system as defined in claim 36 wherein said second signal processing means further comprises:
 demodulating means for receiving and demodulating the elevator signal and for providing the elevator signal as demodulated to said deadzone and limiter.

38. An autopilot nuisance disconnect inhibit system as defined in claim 32 further comprising:
 first switching means for receiving an autopilot control wheel steering signal, for removing the aircraft elevator signal from said second signal processing means and for providing a predetermined signal to said second signal processing means, when the steering signal is in use.

39. An autopilot nuisance disconnect inhibit system as defined in claim 38 wherein said first switching means comprises a relay.

40. An autopilot nuisance disconnect inhibit system as defined in claim 32 further comprising:
 time delay means receiving the inhibit signal for applying a predetermined time delay thereto.

41. An autopilot nuisance disconnect inhibit system as defined in claim 32 further comprising:
 comparing means for receiving an aircraft pitch axis command signal, for comparing the command signal with an externally determined reference value, and for producing an override signal whose value indicates whether the command signal exceeds the externally determined reference value;
 second switching means for receiving an autopilot altitude hold signal, for providing one of two predetermined reference signals, selected according to the state of the hold signal, as the externally determined reference value to said comparing means; and
 second summing means for receiving the inhibit signal and the override signal for producing a limited inhibit signal representing the combination of the inhibit signal and the override signal, and for providing the limited inhibit signal to the autopilot.

42. An autopilot nuisance disconnect inhibit system as defined in claim 41 wherein said comparing means comprises a window comparator.

43. An autopilot nuisance disconnect inhibit system as defined in claim 41, further comprising:
 amplifier means operatively interposed between said comparing means and said second summing means for amplifying the override signal.

44. An autopilot nuisance disconnect inhibit system as defined in claim 41 further comprising:
 time delay means receiving the limited inhibit signal for applying a predetermined time delay thereto.

45. An autopilot failure protection system for an aircraft, comprising:
 comparing means for receiving an aircraft pitch axis command signal, for comparing the command signal with an externally determined reference value, for producing an override signal whose value indicates whether the command signal exceeds the externally determined reference value, and for providing said override signal to the autopilot; and
 switching means for receiving an autopilot altitude hold signal for providing one of two predetermined reference signals, selected according to the state of the hold signal, and the externally determined reference value to said comparing means.

46. An autopilot failure protection system as defined in claim 45 wherein said comparing means comprises a window comparator.

47. An autopilot failure protection system as defined in claim 49 further comprising:
 amplifier means for amplifying the override signal.

48. An autopilot failure protection system as defined in claim 45 further comprising:
 time delay receiving the override signal for applying a predetermined time delay thereto.

* * * * *